(12) United States Patent
McDonald et al.

(10) Patent No.: US 8,734,101 B2
(45) Date of Patent: May 27, 2014

(54) COMPOSITE VANE MOUNTING

(75) Inventors: Seth Alexander McDonald, Cincinnati, OH (US); William James Strock, Cincinnati, OH (US); Courtney James Tudor, Cincinnati, OH (US); William Howard Hasting, Cincinnati, OH (US); Frank Worthoff, West Chester, OH (US)

(73) Assignee: General Electric Co., Schenectady, NY (US)

( * ) Notice: Subject to any disclaimer, the term of this patent is extended or adjusted under 35 U.S.C. 154(b) by 851 days.

(21) Appl. No.: 12/872,234

(22) Filed: Aug. 31, 2010

(65) Prior Publication Data

US 2012/0051923 A1    Mar. 1, 2012

(51) Int. Cl.
    *F01D 5/30* (2006.01)
(52) U.S. Cl.
    USPC ........................................................ 415/209.4
(58) Field of Classification Search
    USPC ............. 415/191, 209.3, 209.4, 210.1, 211.2; 416/221, 248
    See application file for complete search history.

(56) References Cited

U.S. PATENT DOCUMENTS

| | | | |
|---|---|---|---|
| 3,784,320 A * | 1/1974 | Rossmann et al. | 416/215 |
| 3,809,495 A * | 5/1974 | Stahl | 416/135 |
| 4,142,827 A | 3/1979 | Vinciguerra | |
| 4,208,170 A | 6/1980 | Tucker et al. | |
| 4,417,854 A | 11/1983 | Cain et al. | |
| 5,074,752 A | 12/1991 | Murphy et al. | |
| 5,118,257 A | 6/1992 | Blakeley et al. | |
| 5,123,813 A * | 6/1992 | Przytulski et al. | 416/221 |
| 5,226,789 A | 7/1993 | Donges | |
| 5,593,275 A * | 1/1997 | Venkatasubbu et al. | 415/160 |
| 5,791,877 A * | 8/1998 | Stenneler | 416/221 |
| 7,334,996 B2 * | 2/2008 | Corbin et al. | 416/221 |
| 2008/0072569 A1 | 3/2008 | Moniz et al. | |
| 2008/0159856 A1 | 7/2008 | Moniz et al. | |
| 2008/0253885 A1 | 10/2008 | Foose et al. | |

OTHER PUBLICATIONS

U.S. Appl. No. 12/845,261, filed Jul. 28, 2010, McDonald et al.

* cited by examiner

*Primary Examiner* — Nathaniel Wiehe
*Assistant Examiner* — Woody A Lee, Jr.
(74) *Attorney, Agent, or Firm* — General Electric Co.; Steven J. Rosen

(57) ABSTRACT

A vane includes a composite airfoil having a single dovetail root extending chordwise between or near leading and trailing edges of the airfoil. The root is connected to the airfoil and is slidably received in a dovetail slot in an inner vane mount. The dovetail slot has a triangular slot cross section and a flat slot bottom and flat slot pressure and suction side crush faces corresponding to pressure and suction sides of the airfoil. The root has a triangular root cross section, a flat root bottom, and flat dovetail root pressure and suction side crush faces. A biasing means urges the root bottom of the dovetail root away from the slot bottom and presses and preloads the dovetail root pressure and suction side crush faces against the slot pressure and suction side slot crush faces.

20 Claims, 12 Drawing Sheets

COMPOSITE VANE MOUNTING

CROSS-REFERENCE TO RELATED APPLICATIONS

This application is related to U.S. application Ser. No. 12/845,261, filed on Jul. 28, 2010, which is hereby incorporated by reference.

BACKGROUND OF THE INVENTION

1. Field of the Invention

The invention relates to mounting of gas turbine engine composite airfoils and, particularly, for mounting the airfoils in aircraft gas turbine engines.

2. Description of Related Art

Bypass gas turbine engines of the turbofan type generally includes a forward fan and booster compressor, a middle core engine, and an aft low pressure power turbine. The core engine includes a high pressure compressor, a combustor, and a high pressure turbine in a serial flow relationship. The high pressure compressor and high pressure turbine of the core engine are interconnected by a high pressure shaft. The high pressure compressor, turbine, and shaft essentially form the high pressure rotor. The high pressure compressor is rotatably driven to compress air entering the core engine to a relatively high pressure. This high pressure air is then mixed with fuel in the combustor and ignited to form a high energy gas stream. The gas stream flows aft and passes through the high pressure turbine, rotatably driving it and the high pressure shaft which, in turn, rotatably drives the compressor.

The gas stream leaving the high pressure turbine is expanded through a second or low pressure turbine. The low pressure turbine rotatably drives the fan and booster compressor via a low pressure shaft, all of which form the low pressure rotor. The low pressure shaft extends through the high pressure rotor. The fan is part of a fan section of the engine and further includes a fan casing surrounding the fan and supported by a fan frame. Typically, a fan frame includes structural fan struts radially extending across a fan bypass duct. A forward vertical support mount on the fan casing is used to pivotably join and support the engine to a pylon on the aircraft and a thrust mount on the frame located radially inwardly of the bypass duct is used to transfer thrust loads of the engine to the aircraft through the pylon.

The frame may further include fan outlet guide vanes circumferentially distributed between the struts that are used to straighten fan airflow exiting the bypass duct. The fan struts and outlet guide vanes are typically made of metal which are heavier than available composite materials. Outlet guide vane assemblies are used to remove swirl before a fan nozzle at the end of a bypass duct. Such outlet guide vane assemblies are configured to turn the airflow discharged from the fan to a substantially axial direction prior to the fan flow being channeled through the bypass duct. In addition to turning the fan airflow, the outlet guide vane assembly also provides structural stiffness to the fan frame. It is very desirable to incorporate composite materials in the engine in order to lower the weight of the engine which provides a more fuel efficient engine and aircraft. It is known to manufacture aircraft gas turbine engine vane airfoils from composite materials. What is further desired are mounting systems for securely and robustly mounting composite airfoils in the fan frame assembly that will enhance the life of the airfoils and fan frame assembly.

SUMMARY OF THE INVENTION

A vane includes a composite airfoil having pressure and suction sides extending outwardly from an airfoil base to an airfoil tip, chordwise spaced apart leading and trailing edges of the composite airfoil at or near forward and aft ends of the outlet guide vane, a single dovetail root connected to the composite airfoil and extending chordwise from at or near the leading edge to at or near the trailing edge.

The dovetail root is received in a chordwise extending dovetail slot in an inner vane mount. The dovetail slot includes a triangular slot cross section and a flat slot bottom and flat slot pressure and suction side crush faces corresponding to pressure and suction sides of the airfoil and disposed at slot acute angles with respect to the flat slot bottom. The dovetail root has a triangular root cross section and a flat root bottom and flat dovetail root pressure and suction side crush faces corresponding to the pressure and suction sides of the airfoil and disposed at root acute angles with respect to the flat root bottom.

The vane includes a biasing means for urging the root bottom of the dovetail root away from the slot bottom along the dovetail slot and pressing and preloading the flat dovetail root pressure and suction side crush faces of the dovetail root against the slot pressure and suction side slot crush faces. A retainer bracket may cover the root bottom of the dovetail root.

A first exemplary biasing means includes forward and aft jack screws disposed in corresponding forward and aft threaded holes in the inner vane mount along the slot bottom.

A second exemplary biasing means includes axially curved flat springs disposed in the dovetail slot between the root bottom of the dovetail root and the slot bottom. The axially curved flat springs are curved away from the root bottom covered by the retainer bracket, an apex of each axially curved flat spring contacts the root bottom covered by the retainer bracket, and opposite axially spaced apart forward and aft ends of each axially curved flat spring contact the slot bottom.

A third exemplary biasing means includes transversely curved flat springs disposed in the dovetail slot between the root bottom of the dovetail root and the flat slot bottom. The transversely curved flat springs are curved away from the root bottom which is covered by the retainer bracket. An apex of each transversely curved flat spring contacts the root bottom and opposite circumferentially spaced apart first and second side ends of each transversely curved flat spring contact the slot bottom.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
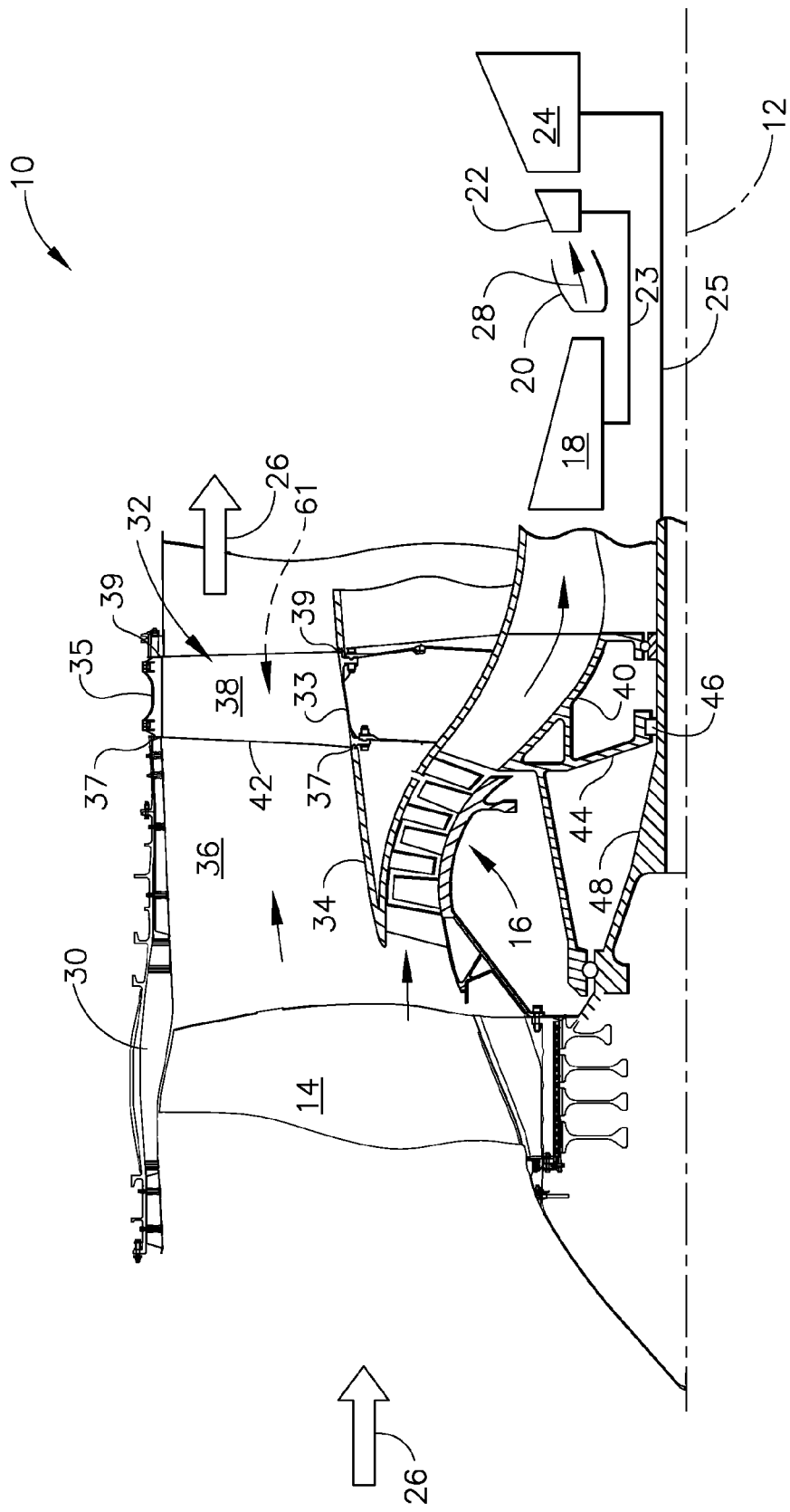
FIG. 1 is a longitudinal part sectional and part diagrammatical view illustration of an exemplary embodiment of an aircraft turbofan gas turbine engine with a fan frame assembly including outlet guide vanes having composite airfoils.

Illustrated in FIG. 1 is an exemplary aircraft turbofan gas turbine engine 10 circumscribed about an engine centerline axis 12 and suitably designed to be mounted to a wing or fuselage of an aircraft. The engine 10 includes, in downstream serial flow communication, a fan 14, a booster or a low pressure compressor 16, a high pressure compressor 18, a combustor 20, a high pressure turbine (HPT) 22, and a low pressure turbine (LPT) 24. The HPT or high pressure turbine 22 is joined by a high pressure drive shaft 23 to the high pressure compressor 18. The LPT or low pressure turbine 24 is joined by a low pressure drive shaft 25 to both the fan 14 and booster or low pressure compressor 16.

In typical operation, air 26 is pressurized by the fan 14 and an inner portion of this air is channeled through the low pressure compressor 16 which further pressurizes the air. The pressurized air is then flowed to the high pressure compressor 18 which further pressurizes the air. The pressurized air is mixed with fuel in the combustor 20 for generating hot combustion gases 28 that flow downstream in turn through the HPT 22 and the LPT 24. Energy is extracted in the two turbines for powering the fan 14, low pressure compressor 16, and the high pressure compressor 18. A flow splitter 34 surrounding the booster compressor 16 immediately behind the fan 14 includes a sharp leading edge which splits the fan air 26 pressurized by the fan 14 into a radially inner stream channeled through the booster compressor 16 and a radially outer stream channeled through the bypass duct 36.

A fan nacelle 30 surrounding the fan 14 is supported by an annular fan frame 32. The low pressure compressor 16 is suitably joined to the fan 14 forward of the fan frame 32, and is disposed radially inboard of an annular flow splitter 34 spaced radially inwardly from an inner surface of the fan nacelle 30 to partially define an annular fan bypass duct 36 therebetween. The fan frame 32 supports the nacelle 30.

The fan frame 32 includes an annular row of composite outlet guide vanes 38 (OGVs) extending radially outwardly through the fan bypass duct 36 and suitably attached to radially inner and outer rings 33, 35 of the fan frame 32. The composite outlet guide vanes 38 are the only structural elements of the fan frame 32 connecting the radially inner and outer rings 33, 35 of the fan frame 32. There are no separate structural struts of the fan frame 32 passing through the fan bypass duct 36. The outlet guide vanes 38 provide both removal of swirl by turning of the bypass flow in the bypass duct 36 and structural capability for the fan frame 32. The outlet guide vanes 38 are mounted to the radially inner and outer rings 33, 35 of the fan frame 32. The inner and outer rings 33, 35 include forward and aft rails 37, 39 illustrated in more detail in FIG. 6.

Figure 2:
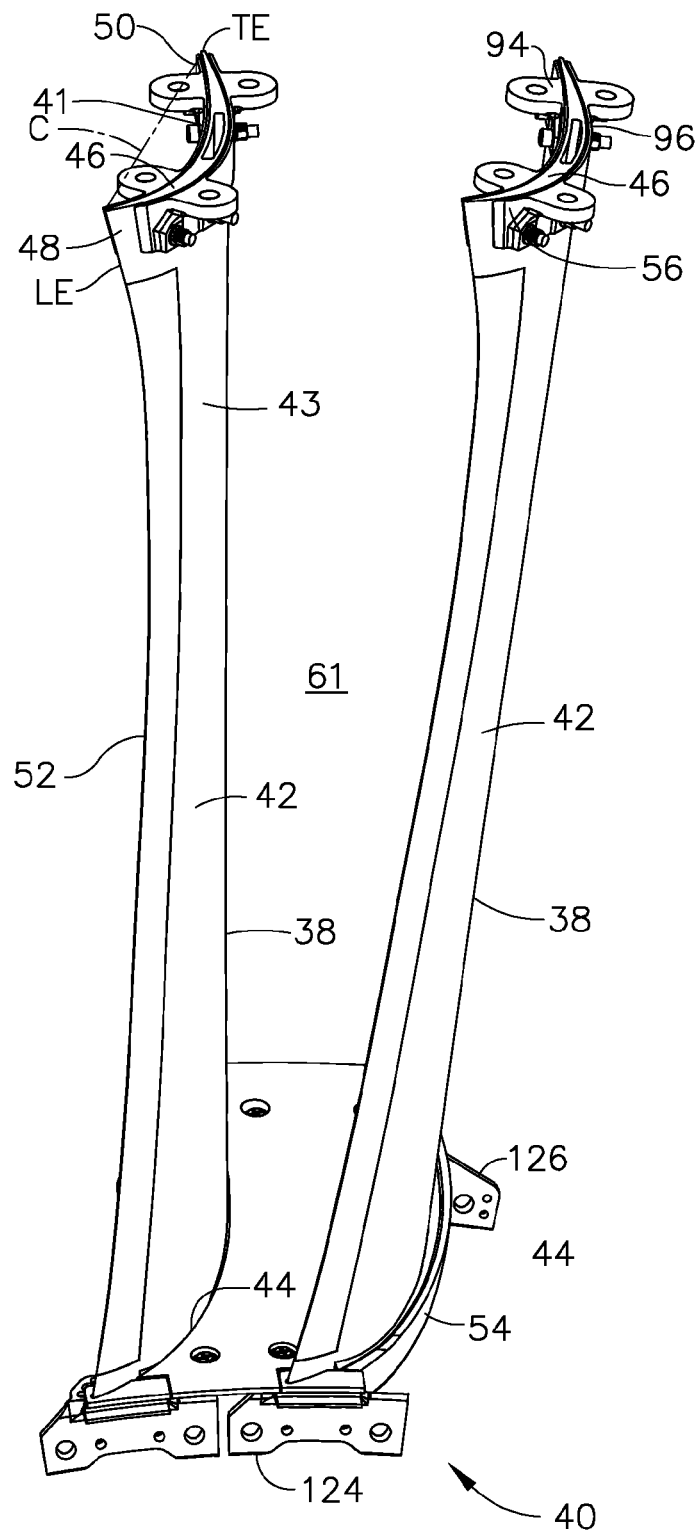
FIG. 2 is a perspective view illustration of a pair of adjacent outlet guide vanes illustrated in FIG. 1.
Figure 3:
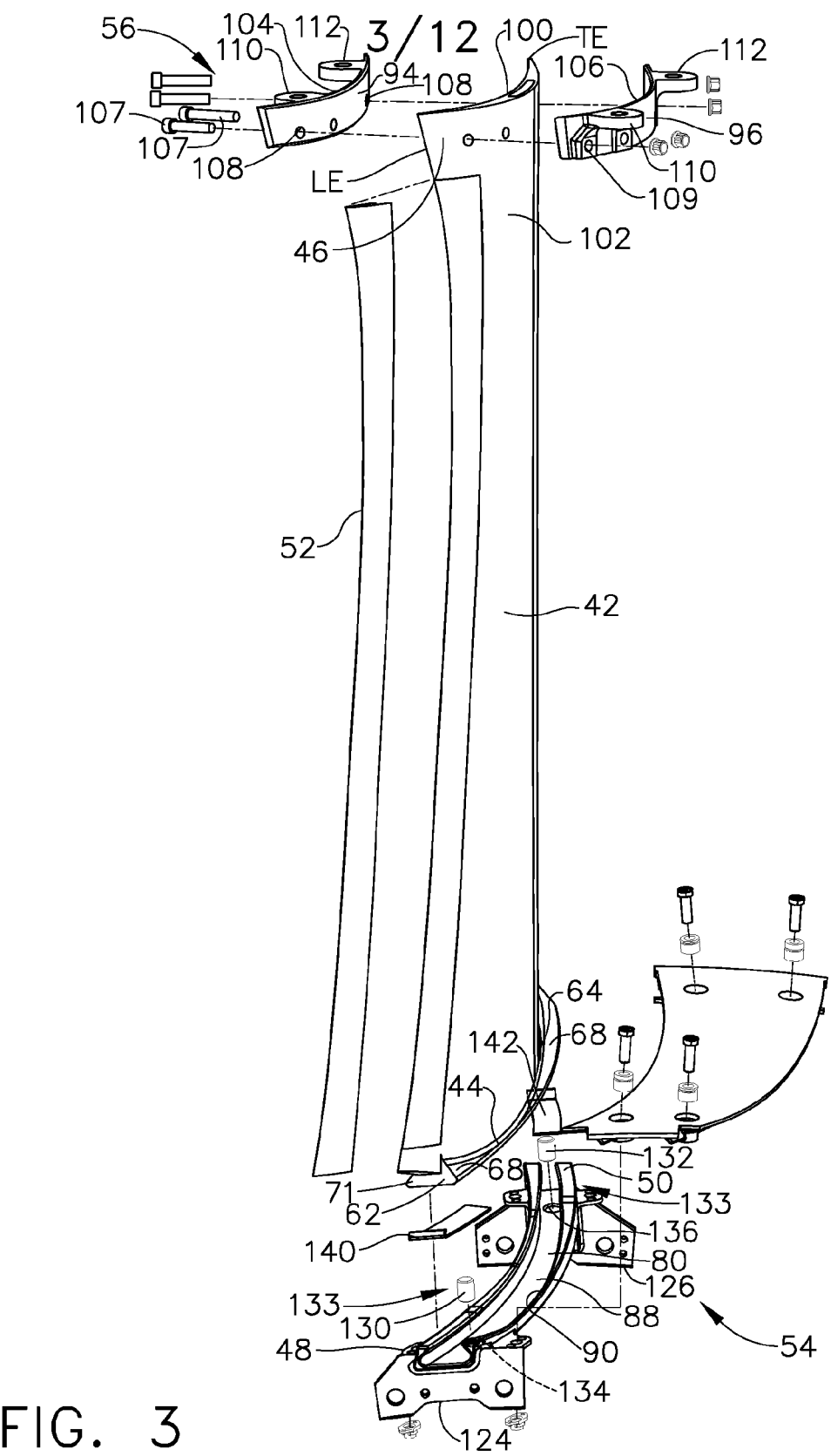
FIG. 3 is an exploded view illustration of one of the outlet guide vanes illustrated in FIG. 2.
Figure 4:
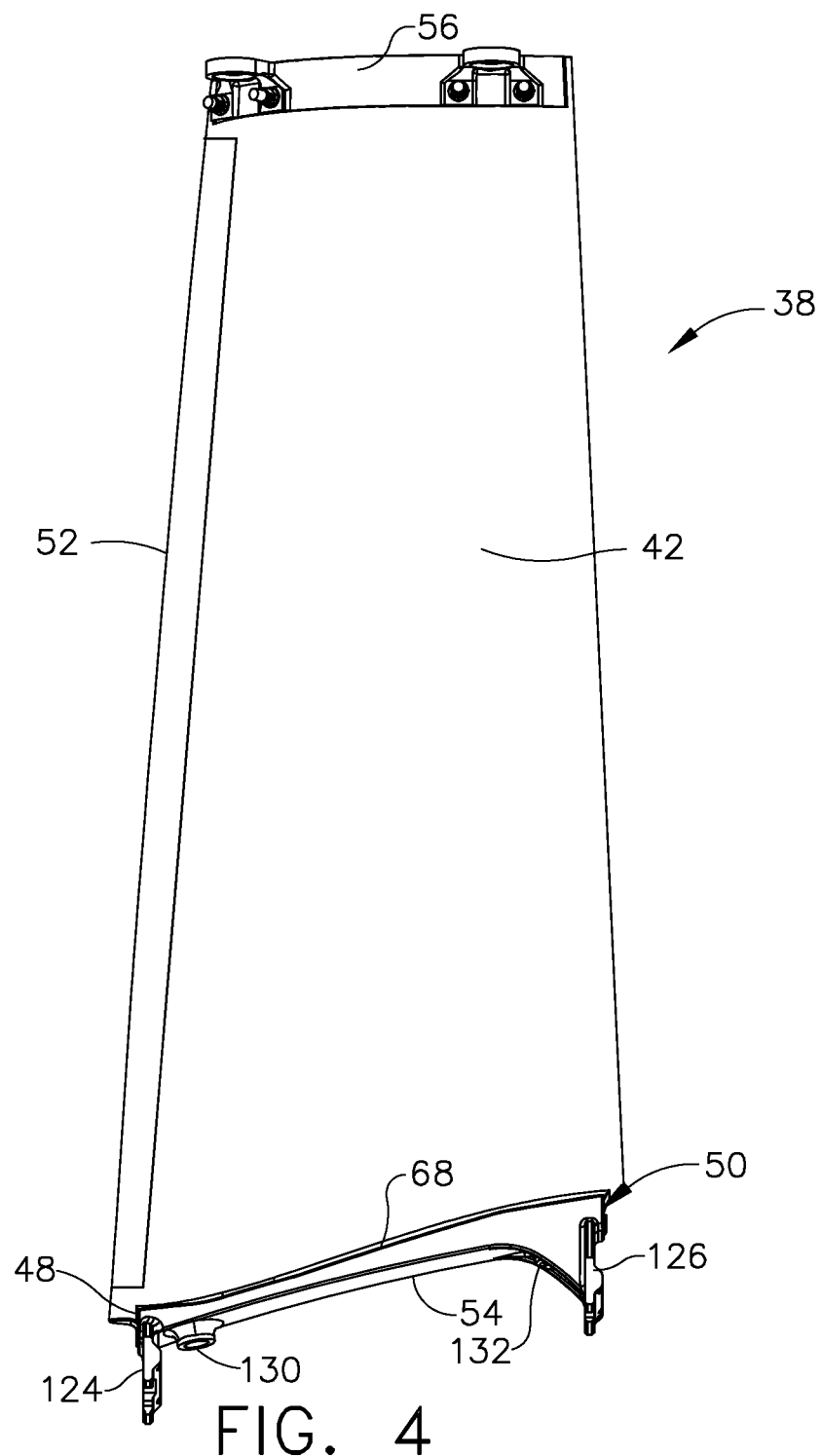
FIG. 4 is a perspective view illustration of an inner vane mount supporting a composite airfoil of one of the outlet guide vanes illustrated in FIG. 2.
Figure 5:
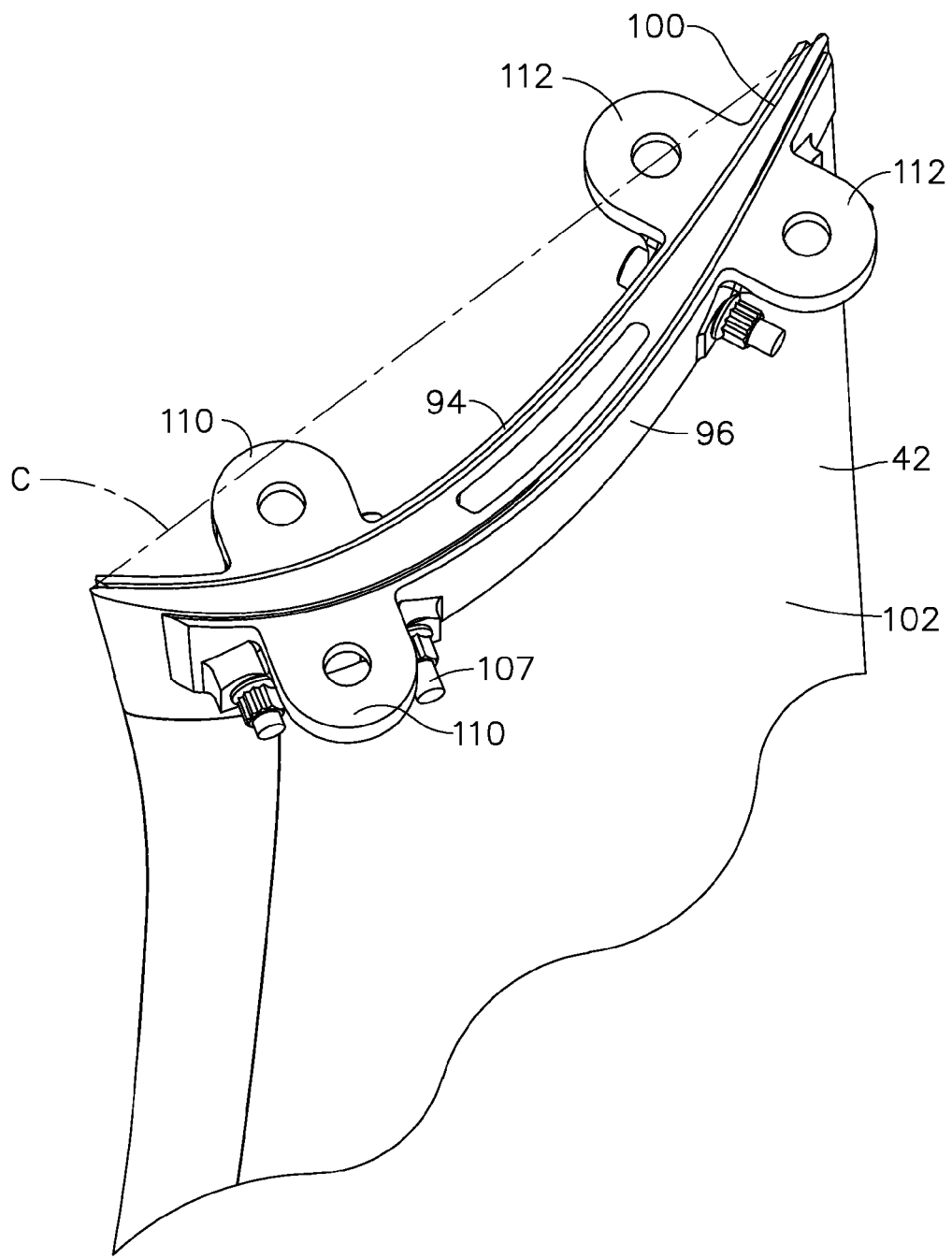
FIG. 5 is an enlarged perspective view illustration of an outer vane mount assembly supporting the composite airfoil illustrated in FIG. 2.

Illustrated in FIGS. 2-4 is an adjacent pair 40 of the outlet guide vanes 38. Each of the outlet guide vanes 38 is an assembly including a composite airfoil 42 having pressure and suction sides 41, 43 extending outwardly from an airfoil base 44 to an airfoil tip 46. The exemplary pressure and suction sides 41, 43 illustrated herein are concave and convex respectively. The composite airfoil 42 includes chordwise spaced apart leading and trailing edges LE, TE at or near forward and aft ends 48, 50 of the outlet guide vane 38. A chord C is defined as a line between leading and trailing edges LE, TE of an airfoil cross section of an airfoil. A metal leading edge tip 52 is disposed along the leading edge LE to protect the composite airfoil against foreign object damage (FOD) and bird ingestion damage. Axially extending inner and outer vane mounts 54, 56 provide for attaching the outlet guide vane 38 to the inner and outer rings 33, 35 of the fan frame 32 (illustrated in FIGS. 1 and 6).

A single chordwise extending dovetail root 68 is connected to the composite airfoil 42. The dovetail root 68 may be connected to the airfoil base 44 by a shank (not illustrated herein). The dovetail root 68 extends from the forward end 48 to the aft end at or near the leading and trailing edges LE, TE of the composite airfoil 42 as illustrated in FIGS. 3 and 10-12. The dovetail root 68 has a triangular root cross section 71 having a flat root bottom 70 and flat dovetail root pressure and suction side crush faces 72, 73 (corresponding to the pressure and suction sides 41, 43 of the airfoil 42) disposed at root acute angles 76 with respect to the flat root bottom 70. The dovetail root 68 is slidably received in a chordwise extending dovetail slot 80 in the inner vane mount 54.

The dovetail slot 80 extends all the way through the inner vane mount 54 between the forward and aft ends 48, 50 of the outlet guide vane 38. The dovetail slot 80 has a triangular slot cross section 84 with a flat slot bottom 81 and flat slot pressure and suction side crush faces 82, 83 (corresponding to the pressure and suction sides 41, 43 of the airfoil 42) disposed at slot acute angles 86 with respect to the flat slot bottom 81. The dovetail root pressure and suction side crush faces 72, 73 are sized and shaped to mate against the slot pressure and suction side crush faces 82, 83. Thus, the slot acute angles 86 and root acute angles 76 are equal and the triangular root and slot cross sections 71, 84 are geometrically similar. The dovetail slot 80 has a slot height HS greater than a root height HR of the dovetail root 68. The dovetail slot 80 has an outer slot opening 88 at a slot top 90 opposite and spaced apart from the slot bottom 81. The outer slot opening 88 is sized and shaped to allow the dovetail root 68 (or a shank connecting the dovetail root to the airfoil) or to pass through while the dovetail root remains trapped within the dovetail slot during assembly and engine operation.

Figure 7:
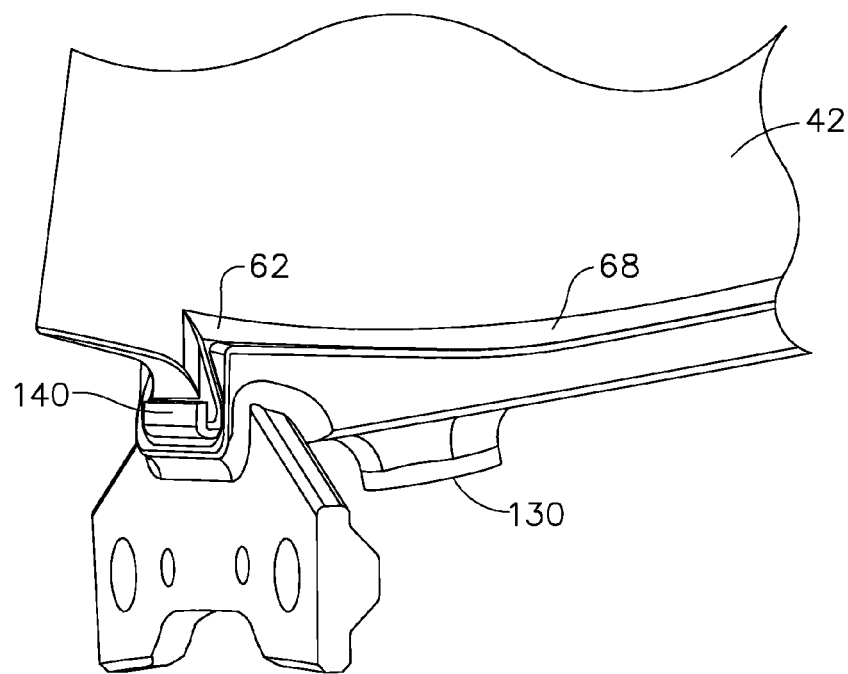
FIG. 7 is an enlarged perspective view illustration of a forward end of a dovetail root of the composite blade mounted in a dovetail slot of an inner vane mount illustrated in FIG. 2.
Figure 7A:
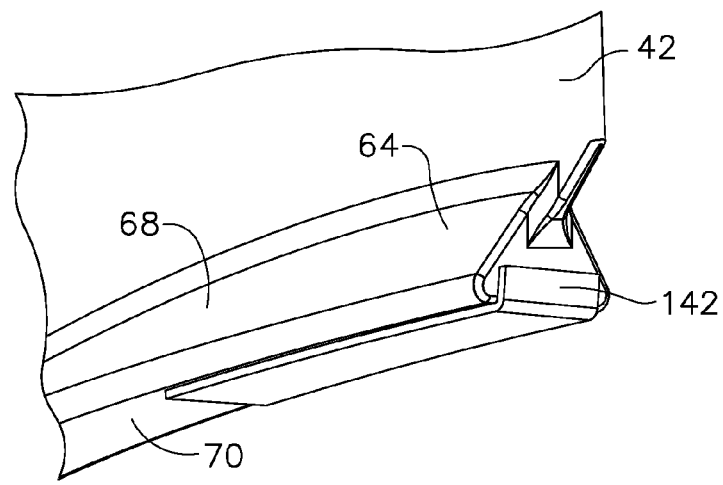
FIG. 7A is an enlarged perspective view illustration of an aft end of a dovetail root of the composite blade illustrated in FIG. 2.
Figure 8:
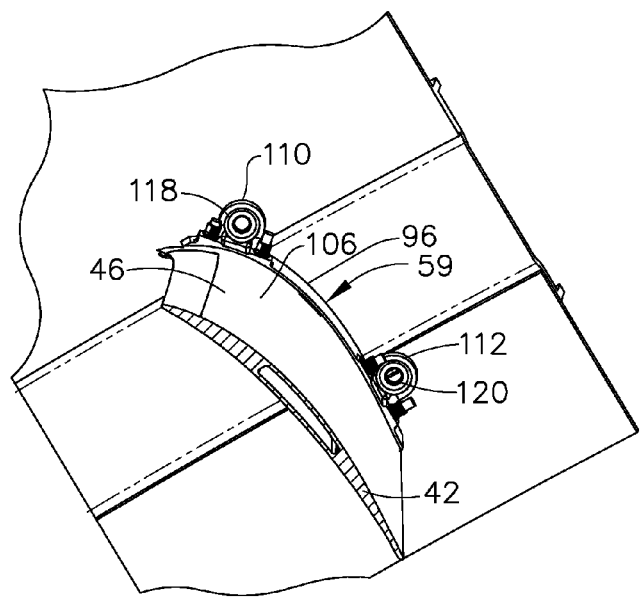
FIG. 8 is an enlarged perspective view illustration of an outlet guide vane mounted to a fan outer fan casing of the fan frame illustrated in FIG. 1.

Forward and aft retainer brackets 140, 142 covering the root bottom 70 of the dovetail root 68 at forward and aft root ends 62, 64 respectively, of the dovetail root 68 as illustrated in FIGS. 7 and 7A, may be used to help evenly distribute force applied by a biasing means along the root bottom 70. Referring to FIGS. 3 and 9-11, forward and aft jack screws 130, 132 disposed in corresponding forward and aft threaded holes 134, 136 in the inner vane mount 54 along the slot bottom 81 provide an exemplary biasing means 133 for urging the root bottom 70, covered or uncovered by the forward and aft retainer brackets 140, 142, of the dovetail roots 68 respectively away from the slot bottom 81 along the dovetail slot 80 and pressing and preloading the flat dovetail root pressure and suction side crush faces 72, 73 of the dovetail root 68 against the slot pressure and suction side slot crush faces 82, 83, respectively. The forward and aft retainer brackets 140, 142 help to evenly distribute the load applied by the jack screws or other biasing means along the root bottoms 70 of the dovetail roots 68.

Figure 6:
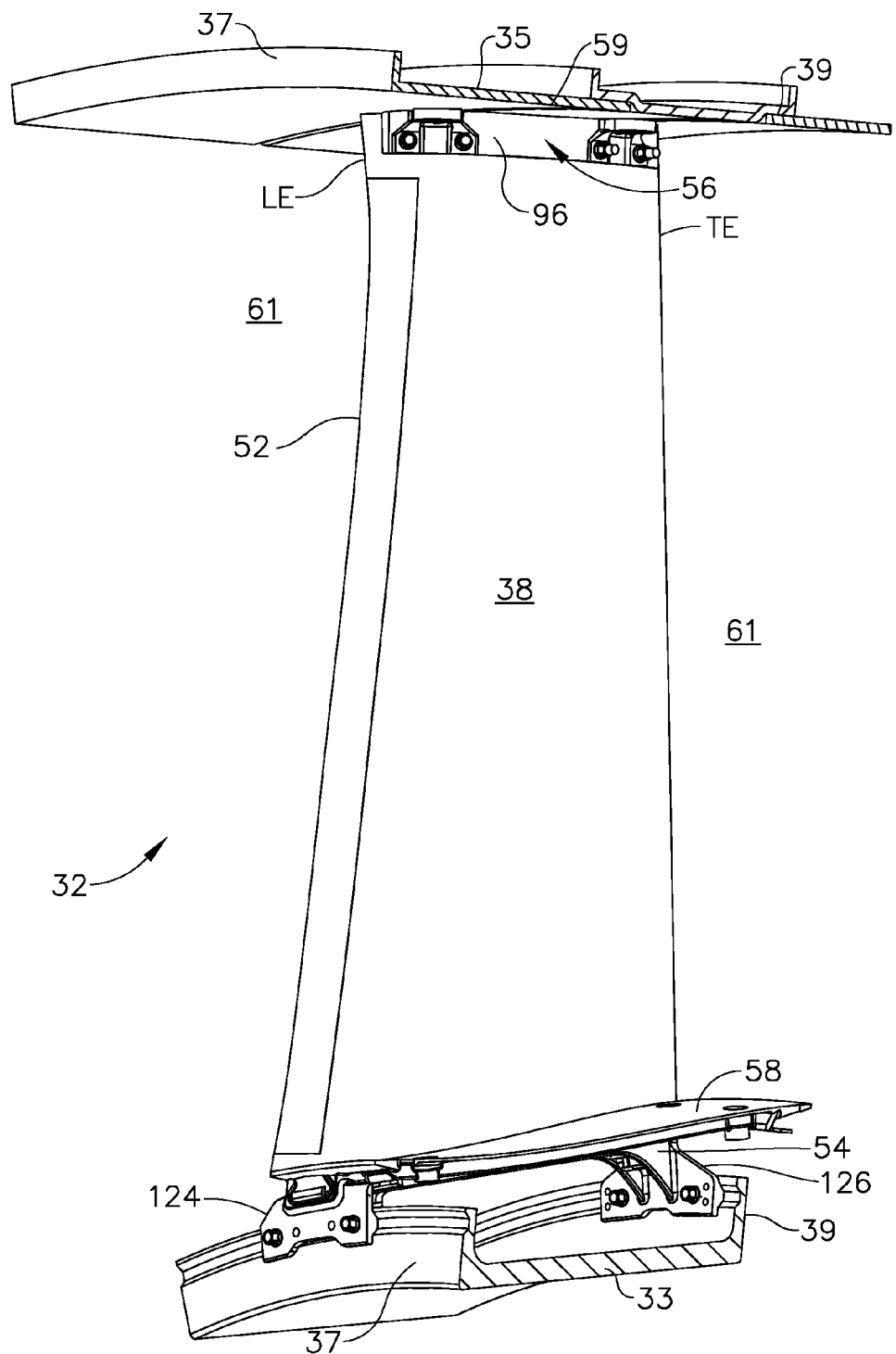
FIG. 6 is an enlarged perspective view illustration of an outlet guide vane mounted between inner and outer rings of the fan frame illustrated in FIG. 1.
Figure 9:
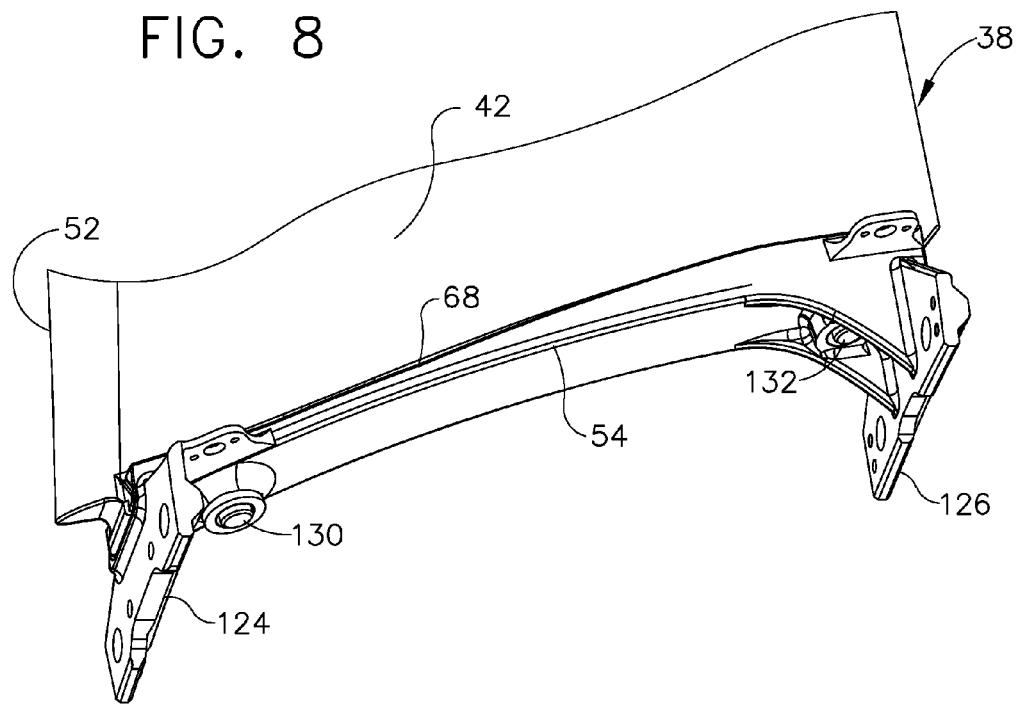
FIG. 9 is an enlarged perspective radially outwardly looking view illustration of the inner vane mount illustrated in FIG. 3.
Figure 10:
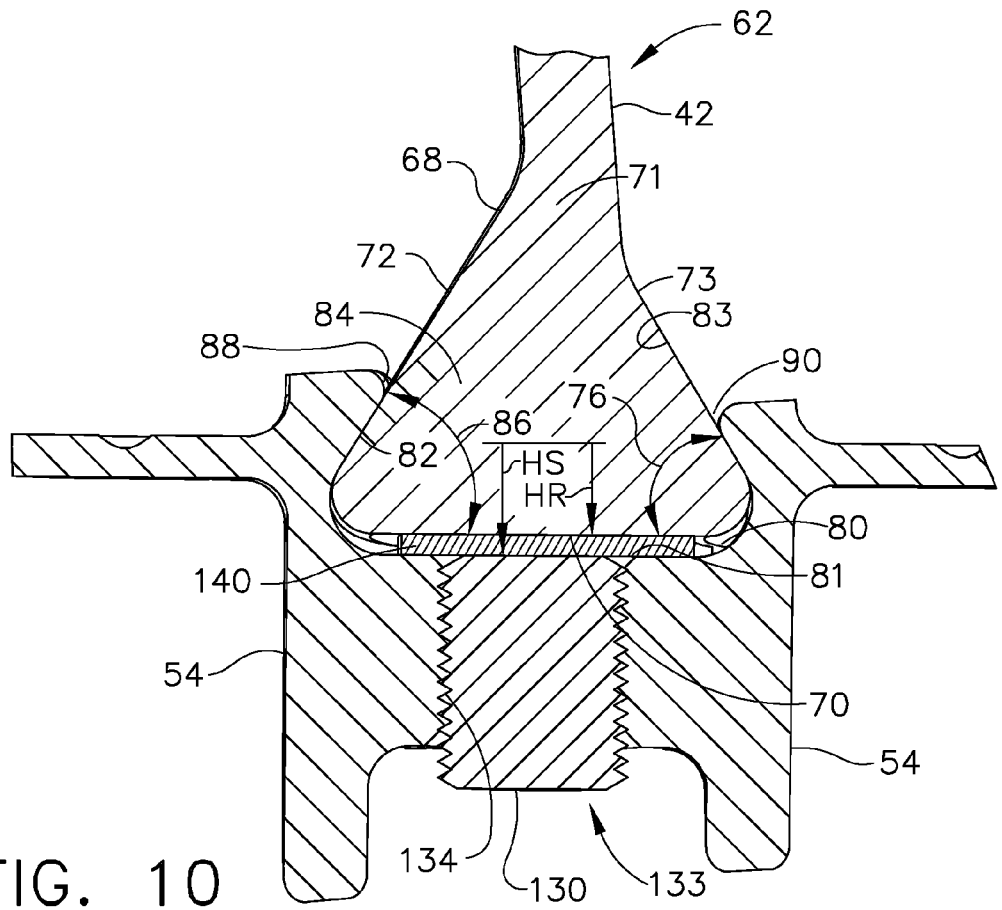
FIG. 10 is a partially sectional and partially perspective view illustration of a forward end of a dovetail root of a composite vane mounted in a dovetail slot of the inner vane mount illustrated in FIG. 9.
Figure 11:
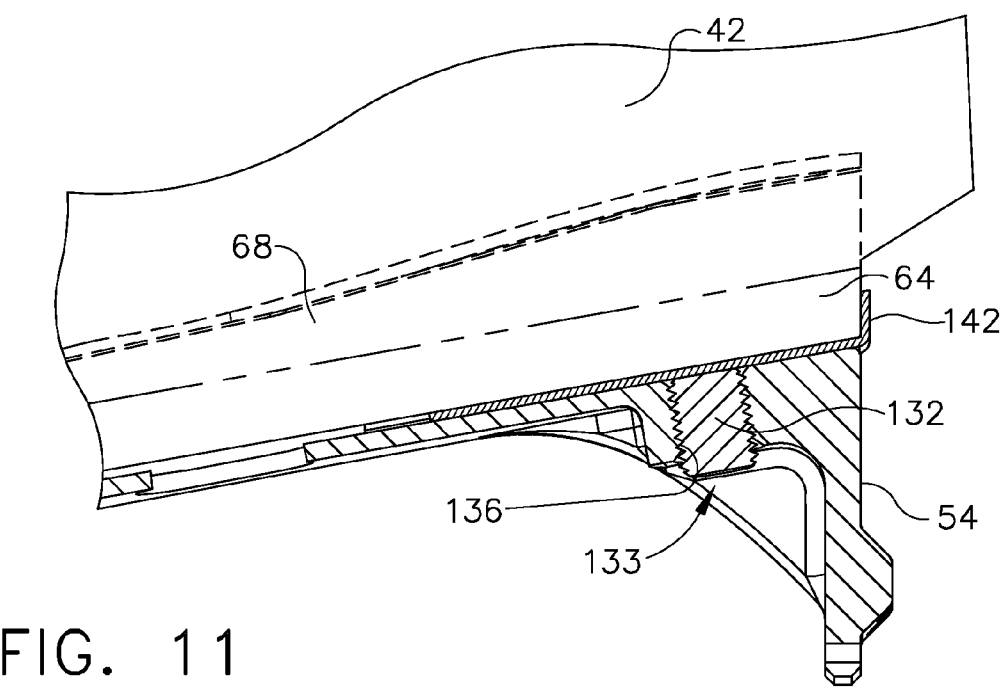
FIG. 11 is a partially sectional and partially perspective view illustration of an aft end of a dovetail root of a composite vane mounted in a dovetail slot of the inner vane mount illustrated in FIG. 9.

Forward and aft flanges 124, 126 depend radially inwardly from the inner vane mount 54 at the forward and aft ends 48, 50 of the outlet guide vane 38 as illustrated in FIGS. 6 and 9. The forward and aft flanges 124, 126 are bolted to the forward and aft rails 37, 39 respectively of the inner ring 33 of the fan frame 32.

Referring to FIGS. 2, 3, 5, and 6, the outer vane mount 56 is illustrated herein as an assembly of widthwise spaced apart pressure and suction side brackets 94, 96 that are mounted to pressure and suction sides 100, 102 respectively of the composite airfoil 42 at the airfoil tip 46. The pressure and suction side brackets 94, 96 include pressure and suction side walls 104, 106 that conform to the shape of the pressure and suction sides 100, 102 respectively of the composite airfoil 42 at the airfoil tip 46 where the pressure and suction side walls 104, 106 are attached to the airfoil tip 46. Chordwise spaced apart upstream and downstream ears 110, 112 extend circumferentially or perpendicularly away from the pressure and suction side walls 104, 106. Bolts 107 disposed through corresponding chordwise spaced apart pressure and suction side holes 108, 109 through the pressure and suction side walls 104, 106 illustrate herein one type of means to attach the pressure and suction side walls 104, 106 to the airfoil tip 46.

Referring to FIGS. 2, 3, and 6-9, fairings 58 are mounted to and between an adjacent pair of the inner vane mounts 54 of the outlet guide vanes 38. The outer vane mounts 56 are attached to an outer fan casing 59 which serves as the outer ring 35 of the fan frame 32. The fairings 58 and the fan casing 59 bound and provide a fan frame flowpath 61 through the fan frame 32 between the composite airfoils 42 of the outlet guide vane 38. Bolts 107 disposed through corresponding chordwise spaced apart upstream and downstream holes 118, 120 through the upstream and downstream ears 110, 112 of the pressure and suction side walls 104, 106 attach the pressure and suction side brackets 94, 96 and the airfoil tip 46 of the composite airfoil 42 to the fan casing 59.

Figure 12:
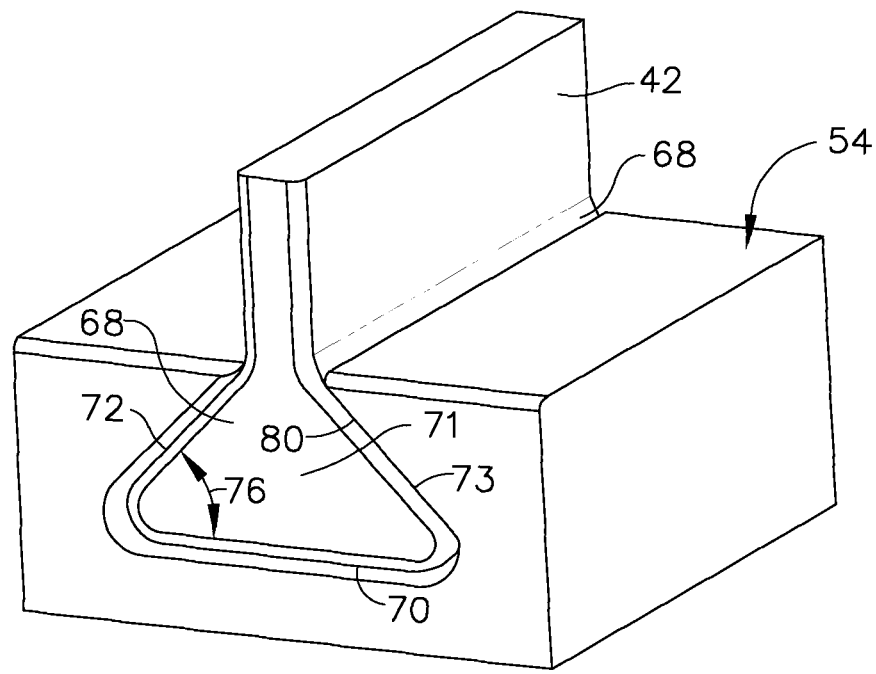
FIG. 12 is a diagrammatical perspective view illustration of a straight dovetail root of a dovetail root disposed in a dovetail slot of the inner vane mount illustrated in FIG. 9.
Figure 13:
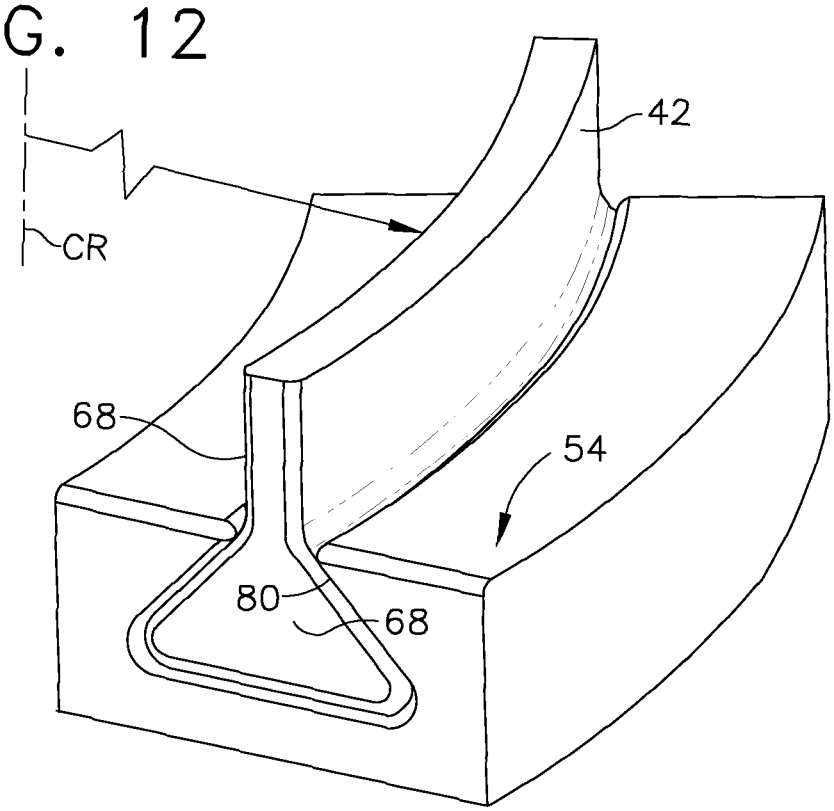
FIG. 13 is a diagrammatical perspective view illustration of a curved dovetail root in a dovetail slot of the inner vane mount.

Various configurations of the dovetail root 68 are contemplated herein. Diagrammatically illustrated in FIG. 12 is a straight dovetail root 68 connected to the airfoil base (not shown in FIG. 12) by a straight shank. The dovetail root 68 has a triangular root cross section 71 having a flat root bottom 70 and flat dovetail root pressure and suction side crush faces 72, 73 (corresponding to the pressure and suction sides 41, 43 of the airfoil 42 illustrated in FIG. 2) disposed at root acute angles 76 with respect to the flat root bottom 70. The straight dovetail root 68 is slidably received in the straight chordwise extending dovetail slot 80. Alternatively, as illustrated in FIG. 13, the dovetail root 68, dovetail slot 80, and respective crush faces may be arced about a common axis of curvature CR.

Figure 14:
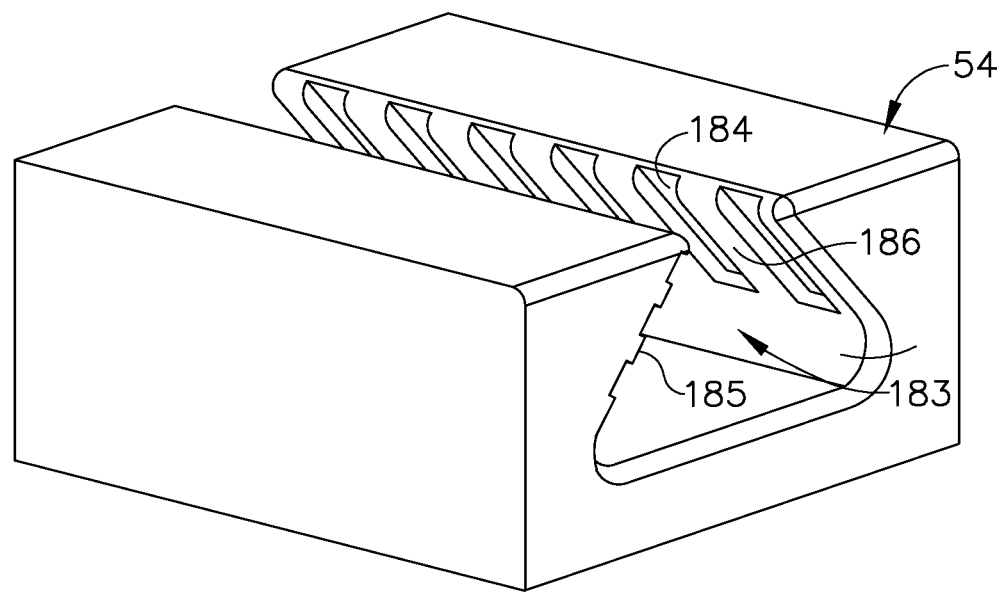
FIG. 14 is a diagrammatical perspective view illustration of an alternative dovetail slot having radially extending grooves in crush faces of the dovetail slot.
Figure 15:
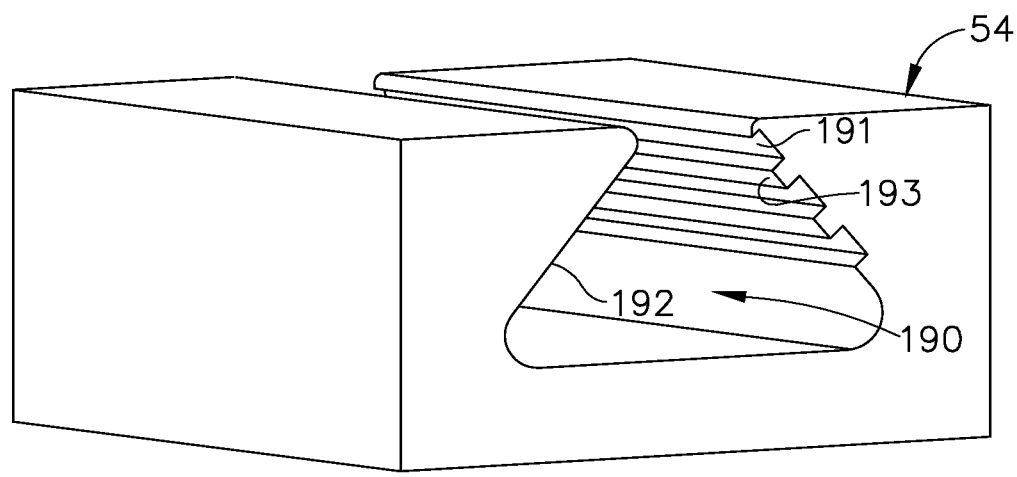
FIG. 15 is a diagrammatical perspective view illustration of an alternative dovetail slot having axially extending grooves in crush faces of the dovetail slot.

Diagrammatically illustrated in FIG. 14 is an alternative dovetail slot in the form of a radially slotted dovetail slot 183 having radially extending surface slots 184 in flat radially slotted slot pressure and suction side crush faces 185, 186. Alternatively, diagrammatically illustrated in FIG. 15 is another alternative dovetail slot in the form of an axially slotted dovetail slot 190 having axially extending surface slots 191 in flat axially slotted slot pressure and suction side crush faces 192, 193.

Figures 16, 17:
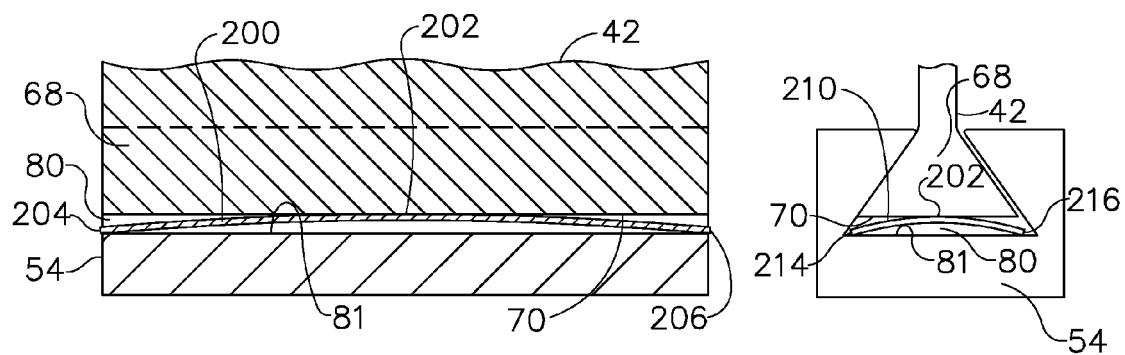
FIG. 16 is a diagrammatical cross sectional view illustration of an axially curved flat spring as an alternative to jack screws illustrated in FIGS. 9-11.
FIG. 17 is a diagrammatical cross sectional view illustration of a transversely curved flat spring as an alternative to jack screws illustrated in FIGS. 9-11.

Diagrammatically illustrated in FIG. 16 is a first alternative to the aft jack screws disclosed above as an exemplary biasing means. The first alternative biasing means includes an axially curved flat spring 200 disposed in the dovetail slot 80 between the root bottom 70 of the dovetail root 68 and the slot bottom 81. Preferably, one axially curved flat spring 200 is disposed at each of the forward and aft root ends 62, 64 of the dovetail root 68. The axially curved flat spring 200 is curved away from the root bottom 70 covered by the retaining bracket (not shown in this FIG.). An apex 202 of the axially curved flat spring 200 contacts the root bottom 70 covered by the retaining bracket and opposite axially spaced apart forward and aft ends 204, 206 of each of the axially curved flat springs 200 contact the slot bottom 81.

Diagrammatically illustrated in FIG. 17 is a second alternative to the aft jack screws disclosed above as an exemplary biasing means. The second alternative biasing means includes a transversely curved flat spring 210 disposed in the slot 80 between the root bottom 70 of the dovetail root 68 and the slot bottom 81. Preferably, one transversely curved flat spring 210 is disposed at each of the forward and aft root ends 62, 64 of the dovetail root 68. The transversely curved flat spring 210 is curved away from the root bottom 70 covered by the retaining bracket (not shown in this FIG.). An apex 202 of the transversely curved flat spring 210 contacts the root bottom 70 covered by the retaining bracket and opposite transversely spaced apart first and second side ends 214, 216 of the transversely curved flat spring 210 contact the slot bottom 81.

Figures 18, 19:
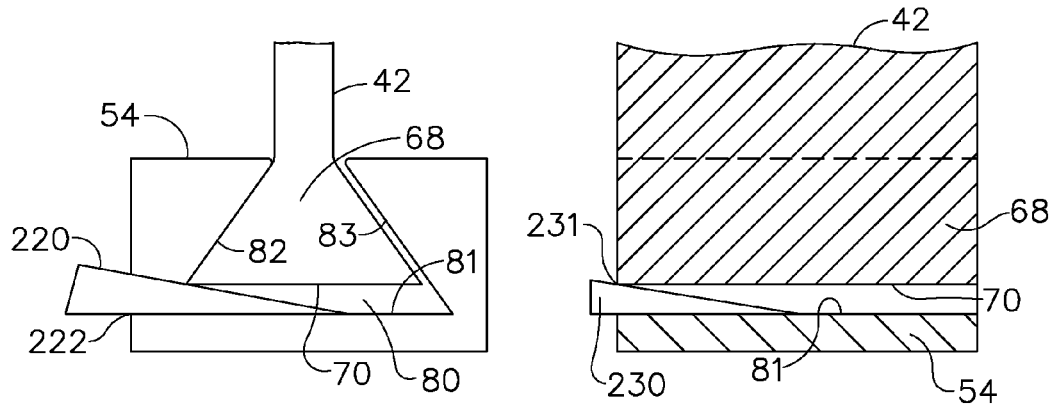
FIG. 18 is a diagrammatical cross sectional view illustration of a circumferentially inserted wedge as an alternative to jack screws illustrated in FIGS. 9-11.
FIG. 19 is a diagrammatical cross sectional view illustration of an axially inserted wedge as an alternative to jack screws illustrated in FIGS. 9-11.

Diagrammatically illustrated in FIG. 18 is a third alternative to the aft jack screws disclosed above as an exemplary biasing means. The third alternative biasing means includes a circumferentially inserted wedge 220 disposed in the dovetail slot 80 and contacting the slot bottom 81 of the dovetail slot 80 and the root bottom 70 of the dovetail root 68. Preferably, one wedge 220 is used at each of the forward and aft root ends 62, 64 of the dovetail root 68. Each wedge 220 is inserted through a rectangular hole 222 in the inner vane mount 54 through one of the flat slot pressure and suction side crush faces 82, 83. Diagrammatically illustrated in FIG. 19 is a fourth alternative to the aft jack screws disclosed above as an exemplary biasing means. The fourth alternative biasing means includes an axially inserted wedge 230 disposed in the slot 80 and contacting the slot bottom 81 of the dovetail slot 80 and the root bottom 70 of the dovetail root 68. Preferably, one wedge 230 is used at each of the forward and aft root ends 62, 64 of the dovetail root 68. Each wedge 230 is inserted through an axial entrance 231 to the slot 80 in the inner vane mount 54.

The present invention has been described in an illustrative manner. It is to be understood that the terminology which has been used is intended to be in the nature of words of description rather than of limitation. While there have been described herein, what are considered to be preferred and exemplary embodiments of the present invention, other modifications of the invention shall be apparent to those skilled in the art from the teachings herein and, it is, therefore, desired to be secured in the appended claims all such modifications as fall within the true spirit and scope of the invention.

Accordingly, what is desired to be secured by Letters Patent of the United States is the invention as defined and differentiated in the following claims:

What is claimed is:

1. A gas turbine engine vane comprising:
    a composite airfoil having pressure and suction sides extending outwardly from an airfoil base to an airfoil tip,
    chordwise spaced apart leading and trailing edges of the composite airfoil at or near forward and aft ends of the vane,
    a single dovetail root extending chordwise from at or near the leading edge to at or near the trailing edge,
    the dovetail root connected to the airfoil base and slidably received in a chordwise extending dovetail slot in an inner vane mount for fixedly attaching the vane to a gas turbine engine frame,
    the dovetail slot having a triangular slot cross section and a flat slot bottom and flat slot pressure and suction side crush faces corresponding to pressure and suction sides of the airfoil and disposed at slot acute angles with respect to the flat slot bottom,
    the dovetail root having a triangular root cross section and a flat root bottom and flat dovetail root pressure and suction side crush faces corresponding to the pressure and suction sides of the airfoil and disposed at root acute angles with respect to the flat root bottom, and
    a biasing means for urging the root bottom of the dovetail root away from the slot bottom along the dovetail slot and pressing and preloading the flat dovetail root pressure and suction side crush faces of the dovetail root against the slot pressure and suction side slot crush faces.

2. The vane as claimed in claim 1, further comprising a retainer bracket covering the root bottom of the dovetail root.

3. The vane as claimed in claim 2, further comprising the biasing means comprising forward and aft jack screws disposed in corresponding forward and aft threaded holes in the inner vane mount along the slot bottom.

4. The vane as claimed in claim 2, further comprising:
    the biasing means comprising an axially curved flat springs disposed in the dovetail slot between the root bottom of the dovetail root and the flat slot bottom,
    the axially curved flat springs curved away from the root bottom covered by the retainer bracket,
    an apex of the axially curved flat spring contacting the root bottom covered by the retainer bracket, and
    opposite axially spaced apart forward and aft ends of the axially curved flat spring contacting the slot bottom.

5. The vane as claimed in claim 2, further comprising:
    the biasing means comprising a transversely curved flat spring disposed in the dovetail slot between the root bottom of the dovetail root and the flat slot bottom,
    the transversely curved flat spring curved away from the root bottom covered by the retainer bracket,
    an apex of the transversely curved flat spring contacting the root bottom covered by the retainer bracket, and
    opposite circumferentially spaced apart first and second side ends of the transversely curved flat spring contacting the slot bottom.

6. The vane as claimed in claim 2, further comprising:
    the biasing means comprising a circumferentially inserted wedge disposed in the dovetail slot between the slot bottom and the root bottom of the dovetail root, and
    the wedge insertable through a rectangular hole in the inner vane mount through one of the flat slot pressure and suction side crush faces.

7. The vane as claimed in claim 2, further comprising the biasing means comprising an axially inserted wedge disposed in the dovetail slot between the slot bottom and the root bottom of the dovetail root and the wedge insertable through an axial entrance of the dovetail slot.

8. The vane as claimed in claim 2, further comprising the dovetail slot, the dovetail root, and the retainer bracket being straight or arced about a common axis of curvature.

9. The vane as claimed in claim 2, further comprising the dovetail slot including radially or axially extending surface slots in the slot pressure and suction side crush faces.

10. The vane as claimed in claim 1, further comprising the dovetail slot, the dovetail root, and the retainer bracket being straight or arced about a common axis of curvature.

11. A gas turbine engine annular fan frame comprising:
    an annular row of composite outlet guide vanes extending radially between and connecting radially inner and outer rings of the fan frame,
    each of the vanes including a composite airfoil having pressure and suction sides extending outwardly from an airfoil base to an airfoil tip,
    the outlet guide vanes mounted in axially extending inner and outer vane mounts attached to the inner and outer rings respectively,
    chordwise spaced apart leading and trailing edges of the composite airfoil at or near forward and aft ends of the outlet guide vane,
    a single chordwise extending dovetail root connected to the airfoil base and slidably received in a chordwise extending dovetail slot in an inner vane mount,
    the dovetail root extending chordwise from at or near the leading edge to at or near the trailing edge,
    the dovetail slot having a triangular slot cross section and a flat slot bottom and flat slot pressure and suction side crush faces corresponding to pressure and suction sides of the airfoil and disposed at slot acute angles with respect to the flat slot bottom,
    the dovetail root having a triangular root cross section and a flat root bottom and flat dovetail root pressure and suction side crush faces corresponding to the pressure and suction sides of the airfoil and disposed at root acute angles with respect to the flat root bottom, and
    a biasing means for urging the root bottom of the dovetail root away from the slot bottom along the dovetail slot and pressing and preloading the flat dovetail root pressure and suction side crush faces of the dovetail root against the slot pressure and suction side slot crush faces.

12. The fan frame as claimed in claim 11, further comprising a retainer bracket covering the root bottom of the dovetail root.

13. The fan frame as claimed in claim 12, further comprising the biasing means comprising forward and aft jack screws disposed in corresponding forward and aft threaded holes in the inner vane mount along the slot bottom.

14. The fan frame as claimed in claim 11, further comprising:
the outer vane mounts attached to an outer fan casing or the outer ring,
fairings mounted to and between an adjacent pair of the inner vane mounts of the outlet guide vanes, and
a fan frame flowpath through the fan frame extending between the composite airfoils of the outlet guide vane and further bounded by the fairings and the outer fan casing or the outer ring.

15. The fan frame as claimed in claim 14, further comprising a retainer bracket covering the root bottom of the dovetail root and the biasing means comprising forward and aft jack screws disposed in corresponding forward and aft threaded holes in the inner vane mount along the slot bottom.

16. The fan frame as claimed in claim 14, further comprising:
the biasing means comprising an axially curved flat springs disposed in the dovetail slot between the root bottom of the dovetail root and the flat slot bottom,
the axially curved flat springs curved away from the root bottom covered by a retainer bracket,
an apex of the axially curved flat spring contacting the root bottom covered by a retainer bracket, and
opposite axially spaced apart forward and aft ends of the axially curved flat spring contacting the slot bottom.

17. The fan frame as claimed in claim 14, further comprising:
the biasing means comprising a transversely curved flat spring disposed in the dovetail slot between the root bottom of the dovetail root and the flat slot bottom,
the transversely curved flat spring curved away from the root bottom covered by the retainer bracket,
an apex of the transversely curved flat spring contacting the root bottom covered by a retainer bracket, and
opposite circumferentially spaced apart first and second side ends of the transversely curved flat spring contacting the slot bottom.

18. The fan frame as claimed in claim 14, further comprising the dovetail root and dovetail slot being straight or arced about a common axis of curvature.

19. The fan frame as claimed in claim 14, further comprising the dovetail slot, the dovetail root, and the retainer bracket being straight or arced about a common axis of curvature.

20. The fan frame as claimed in claim 14, further comprising the dovetail slot including radially or axially extending surface slots in the slot pressure and suction side crush faces.

* * * * *